UNITED STATES PATENT OFFICE 2,504,064

POLYETHYLENEGLYCOL ETHERS OF BIS(DI-ALKYL-HYDROXYPHENYL)-METHANE

Louis H. Bock, Huntingdon Valley, and James L. Rainey, Abington, Pa., assignors to Rohm & Haas Company, Philadelphia, Pa., a corporation of Delaware No Drawing. Application April 5, 1946, Serial No. 659,858

3 Claims. (Cl. 260—613)

This invention relates to new compounds which are particularly useful as capillary-active or surface-active agents and to a method of preparing same. Such compounds are unusually efficient emulsifying agents under a wide variety of conditions and may also be employed as detergents. More specifically, this invention relates to non-ionic, capillary-active compositions comprising the bis(hydrocarbon-substituted hydroxy polyalkyleneoxyphenyl)methanes having the general formula:

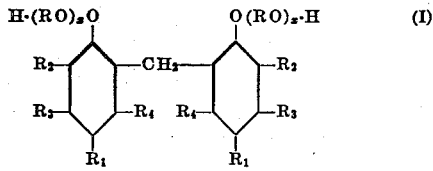

in which R is an alkylene group of two to three carbon atoms, $x$ is an integer having a value of four to twenty, $R_1$ and $R_2$ are hydrocarbon groups containing from one to eighteen carbon atoms, and $R_3$ and $R_4$ are hydrogen atoms or hydrocarbon groups containing one to eighteen carbon atoms. In the above formula, the sum of the carbon atoms in the groups represented by $R_1$, $R_2$, $R_3$, and $R_4$ is from five to twenty.

The compounds of this invention, represented by Formula I above, may be considered to have a hydrophilic portion represented by $—(RO)_x·H$ and a hydrophobic portion represented by the hydrocarbon groups $R_1$, $R_2$, $R_3$, and $R_4$. A balance of the number of alkyleneoxy, $—RO—$, groups and the total number of carbon atoms in the $R_1$, $R_2$, $R_3$, and $R_4$ group results in molecules which tend to orient at an interface and display capillary activity. At the same time, the molecular weight of the compounds is relatively high, and this high molecular weight together with the balanced hydrophilic and hydrophobic portions imparts to the compounds those properties which are usually associated with micelles of ordinary soaps. In addition, these compounds have real advantages over soaps, particularly those advantages resulting from the non-ionic character of the compounds.

It has been proposed heretofore to react alkylene oxides with substituted phenols to produce polyglycol ethers of the phenols. The resulting compounds, however, have different structures and different physical properties from the compounds of this invention and, as a result, their uses are different. The advantage of the instant compounds is readily apparent when a comparison of the two kinds of compounds is made in specific operations, such as in the emulsification of hydrocarbon solvents or in the laundering of fabrics.

A method of preparing these compounds involves two steps, the first of which comprises reacting by condensing one mol of formaldehyde with two mols of a phenol which has hydrocarbon substituent groups in two of the three reactive ortho and para positions. The phenol may or may not contain hydrocarbon substituents in the meta position. Preferably, the substituted phenol is refluxed with a slight excess of aqueous formaldehyde in the presence of a catalytic amount of a mineral acid, such as sulfuric, hydrochloric, or phosphoric acid, or a strong organic acid such as oxalic acid. An emulsifying agent, such as Twitchell's reagent, is used advantageously to emulsify the phenol so that it will react more readily. The yield of the condensation product is ordinarily quantitative, and the product may be purified by conventional methods such as distillation. The products of this condensation reaction are bis(hydrocarbon-substituted hydroxyphenyl)-methanes having the general formula:

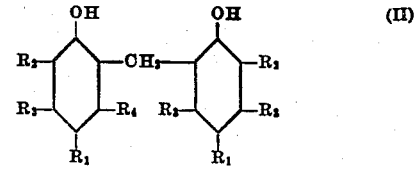

in which the characters $R_1$, $R_2$, $R_3$, and $R_4$ have the same significance indicated in connection with Formula I.

In the second step of the process, the bis-(hydrocarbon-substituted hydroxyphenyl)methane is reacted with an alkylene oxide having a chain of two to three carbon atoms, such as ethylene oxide or propylene oxide. This reaction is preferably carried out in the presence of a catalyst, such as hydroxide of an alkali metal, at a temperature from about 120° to about 190° C. until four to twenty mols of the alkylene oxide has reacted to produce a compound which has a balance of hydrophilic and hydrophobic groups and is, therefore, capillary-active. Because this reaction is exothermic, it is desirable to control it by cooling means. It has also been found desirable to carry out the reaction under superatmospheric pressure, especially when ethylene oxide is used as a reactant. A pressure from about three to about one hundred pounds per square inch has been found to be satisfactory.

As is known, the alkylene oxide reacts with the phenolic hydroxyl groups to form polyether alcohol groups, which are represented in Formula I above by —(RO)$_x$·H. Thus, for example, when five mols of ethylene oxide reacts per hydroxyl group in the bis(hydrocarbon-substituted hydroxyphenyl)methane, this portion of the molecule becomes

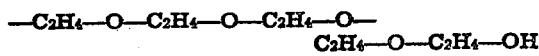

While all of the compounds included within the disclosure above set forth exhibit capillary activity, the optimum balance of hydrophilic and hydrophobic groups to produce such activity is provided by having the number of ether groups approximately in proportion to the number of carbon atoms in the hydrocarbon substituents. This may be illustrated by a comparison of the derivatives of bis(di-sec-butyl phenyl)methane and bis(di-sec-octyl phenyl)methane. In the case of the former, the optimum balance of properties is obtained when eight molecules of ethylene oxide are reacted with each phenolic hydroxyl group, whereas in the case of the latter such balance is obtained when the number of molecules of reacted ethylene oxide is twelve for each phenolic hydroxyl group.

In preparing the compounds of this invention, it is essential that the original phenol used in the first step be substituted by hydrocarbon groups in two of the three positions ortho or para to the phenolic group. The hydrocarbon substituents may be alkyl or cycloalkyl groups, such as methyl, ethyl, isobutyl, tertiary amyl, and cyclohexyl groups, or aromatic groups such as phenyl or tolyl groups, or aralkyl groups such as the benzyl group. The meta positions of the original phenol need not be substituted by hydrocarbon groups if the number of carbon atoms in the ortho and para substituent groups totals five to twenty. On the other hand, the meta positions may be substituted by hydrocarbon groups, such as alkyl, cycloalkyl, aryl, or aralkyl groups, provided the total number of carbon atoms in all of the substituents does not exceed twenty.

When the capillary-active compounds of this invention are prepared by the method described above, suitable and typical phenols which may be used include 2-methyl-4-tert-octylphenol, 3-methyl-2,4-di-tert-butylphenol, 2,4-di-sec-amylphenol, 2-methyl-4-tert-butylphenol, 2,4-di-n-amylphenol, 2,4-di-sec-octylphenol, 2-tert-butyl-4-n-hexadecylphenol, 2-n-butyl-4-phenylphenol, 2-tert-butyl-4-benzylphenol, 2 - ethyl - 4 - cyclohexyl - phenol, and isomers of the foregoing substituted phenols.

The following examples serve to illustrate the method of making the products of this invention:

*Example 1*

A mixture of 234 parts by weight (one mol) of 2,4-di-tert-amylphenol, 61 parts of 37% aqueous formaldehyde solution, one part of Twitchell's reagent, and a solution of 2.5 parts of oxalic acid dihydrate in 15 parts of water was agitated under reflux at a temperature of 100°–102° C. for six hours. During this time, the mixture thickened appreciably. At the end of six hours, the reaction mixture was cooled to 80° C., and 200 parts of toluene, 100 parts of water, 30 parts of sodium chloride, and five parts of sodium bicarbonate were added. The mixture was allowed to stratify in a separatory funnel, and the lower aqueous layer, which contained the excess formaldehyde, was drawn off. The upper layer was dried by refluxing through a water separator until the distillate contained no more water. The toluene solution was then filtered and stripped under vacuum until the pot temperature was 200° C. and the pressure was five mm. of mercury. The yield was 235 parts of a sticky red-amber solid which had a hydroxyl number of 198.

Two hundred forty parts (one-half mol) of the reaction product prepared as above described and two parts of powdered sodium hydroxide were warmed to 160° C. in a one-liter three-necked flask equipped with a stirrer, a thermometer, and an inlet tube for ethylene oxide. Ethylene oxide was passed in under slight pressure while the temperature was maintained at 160°–165° C. In four hours, a total of 484 parts (eleven mols) of ethylene oxide was absorbed. The product was then cooled in an atmosphere of nitrogen. The yield was 726 parts of an amber liquid which was readily soluble in water and which was an excellent agent for emulsifying hydrocarbon solvents in water.

*Example 2*

The procedure of Example 1 was followed with the use of nine mols of ethylene oxide instead of eleven mols. The product thus obtained was more soluble in aliphatic hydrocarbons than the product of Example 1 and was more effective in emulsifying hydrocarbons in water.

*Example 3*

Three hundred eighteen parts (1.0 mol) of dicaprylphenol was treated was a solution of aqueous formaldehyde in the manner described in Example 1. Three hundred twenty-four parts of a viscous liquid was obtained. This liquid was essentially bis(hydroxy dicapryl phenyl)methane.

Three hundred twenty-four parts (one-half mol) of the product described in this way was treated with ethylene oxide in the same manner as is described in Example 1 until four hundred forty parts (ten mols) of ethylene oxide had been absorbed. This product was insoluble in water but had particularly good solubility in, and showed particularly good emulsifying power for, aliphatic hydrocarbons of low solvency such as spray oils.

*Example 4*

Two hundred eighteen parts (one mol) of 2-methyl-4-tert-octylphenol (diisobutyl o-cresol) was treated with an aqueous solution of formaldehyde in the manner described in Example 1 in the presence of 0.9 part of Twitchell's reagent. The product was a sticky solid which began to crystallize on long standing at room temperature. On distillation, almost all of the product boiled at 230°–250° C. at 2 mm. of mercury pressure. The hydroxyl number of the distillate was 233.

Two hundred twenty-six parts (one-half mol) of the distilled product was treated with four hundred eighty-four parts (eleven mols) of ethylene oxide in the manner previously described, to produce the excellent emulsifying agent, bis-(2-methyl-4-tert-octylphenoxy polyethoxy ethanol)methane. A 1% aqueous solution of this product was clear at 25° C. but became turbid at 60° C.

*Example 5*

The procedure of Example 4 was followed with the use, however, of 660 parts (15 mols) of ethylene oxide. The compound obtained here differed from that of Example 4 in being more soluble in water. A 1% aqueous solution of the product was clear at all temperatures up to and including its boiling point and was an excellent emulsifier.

The compounds of this invention are especially good as emulsifiers for hydrocarbons such as "kerosene, "spray oil," and xylene, which are the customary solvents for organic insecticides. Thus, they may be used advantageously to emulsify in water hydrocarbon solutions of such water-insoluble insecticides as DDT (dichlor-diphenyl-trichlorethane). Stable emulsions are obtained not only with distilled or soft waters but also with hard water and even sea water. For example, an insecticidal emulsion was prepared by stirring one volume of a 25% xylene solution of DDT containing 3% of the compound of Example 1 above into four volumes of water having a hardness of seventeen grains per gallon. The resulting emulsion was very stable and showed no separation whatever over a period of an hour. In another instance, one part of the above xylene solution was shaken with four parts of a synthetic sea water containing eleven grams $MgCl_2 \cdot 6H_2O$, 1.6 grams $CaCl_2 \cdot 2H_2O$, 4.0 grams $Na_2SO_4$, and 25 grams $NaCl$ per liter of solution. The resulting emulsion was poured into a glass cylinder and allowed to stand. After thirty minutes, there was no evidence of separation.

In addition to their emulsifying ability, the compounds involved herein are excellent detergents as evidenced by Launderometer tests.

We claim:
1. The compound having the formula:

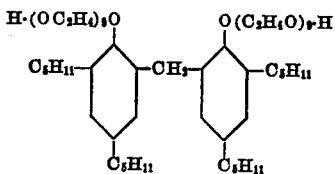

in which the —$C_5H_{11}$ groups are secondary amyl groups.

2. The compound having the formula

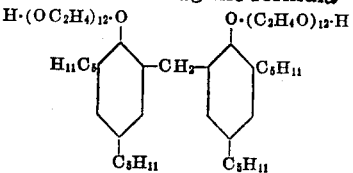

in which the —$C_5H_{11}$ groups are tert.-amyl groups.

3. Surface-active compounds having the formula

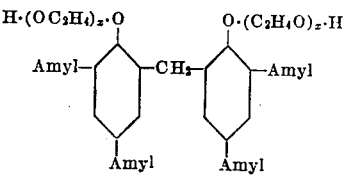

in which $x$ is an integer having a value of 9 to 12.

LOUIS H. BOCK.
JAMES L. RAINEY.

REFERENCES CITED

The following references are of record in the file of this patent:

UNITED STATES PATENTS

| Number | Name | Date |
| --- | --- | --- |
| 1,633,927 | Davidson | June 28, 1927 |
| 2,040,212 | Orthner | May 12, 1936 |
| 2,060,410 | Balle | Nov. 10, 1936 |
| 2,076,624 | De Groote | Apr. 13, 1937 |
| 2,233,381 | De Groote | Feb. 25, 1941 |
| 2,250,480 | Gump | July 29, 1941 |
| 2,430,002 | De Groote | Nov. 4, 1947 |

OTHER REFERENCES

De Groote, "Ohio State University Engineering Experiment Station News," vol. XX, No. 1, Feb. 1948, pages 13–20 (page 20 relied upon).

Dow et al., "Report of Investigation, Dept. of Interior, Bureau of Mines, Serial No. 2692," The Physical Chemistry of Oil Field Emulsions, June 1925, 13 pages (page 7 especially relied upon).